United States Patent [19]

Below

[11] 4,378,402
[45] Mar. 29, 1983

[54] SURFACING COMPOSITIONS, METHODS AND RESULTING PRODUCTS

[76] Inventor: Charles Below, 19 Sombrero Blvd., Marathon, Fla. 33052

[21] Appl. No.: 318,679

[22] Filed: Nov. 5, 1981

[51] Int. Cl.$^3$ .............................................. B32B 7/00
[52] U.S. Cl. ................................... 428/247; 29/527.2; 428/256; 428/481; 428/537; 523/218; 523/513; 523/521; 523/527; 523/444; 523/466; 524/444; 524/448; 524/594; 524/597
[58] Field of Search ............... 523/219, 218, 513, 527, 523/521, 444, 466; 428/247, 256, 537; 29/527.2; 524/444, 448, 594, 597

[56] References Cited

U.S. PATENT DOCUMENTS 2,804,437  8/1957  Katz et al. ........................... 523/218
4,128,524  12/1978  Barnett et al. ...................... 523/218

Primary Examiner—Lewis T. Jacobs
Attorney, Agent, or Firm—Carroll F. Palmer

[57] ABSTRACT

A composition for producing surface layers on wood or other substrates is formed from diatomite, expanded perlite, chopped glass fibers and a thermosettable resin mixed in specified amounts to provide a flowable mixture. When applied to the substrate as a layer about 1 to 2 cms. thick and the resin component has cured, a tough, impact-resistant, watertight surface is created on the substrate. The new compositions and surfacing methods are particuarly useful for refinishing the hulls of wooden boats.

8 Claims, No Drawings

SURFACING COMPOSITIONS, METHODS AND RESULTING PRODUCTS

BACKGROUND OF THE INVENTION

1. Field of the Invention

This invention relates broadly to compositions for surfacing wood or other substrates, to methods of surfacing substrates and to the resulting surfaced products. More particularly, the invention concerns compositions for producing tough, impact-resistant, watertight surface layers on substrates, methods of using such compositions and the products resulting from such methods.

2. Description of the Prior Art

There are innumerable compositions designed for surfacing of wood, plastic, metal or other substrates to provide protective surface layers on the substrates. The resulting protective layers may vary in thickness from less than a millimeter to several centimeters and provide a great variety of protective qualities, e.g., protection varying from only corrosion resistant to strong, structural shielding. This present invention concerns surfacing compositions that are in the class that produce surface layers of substantial thickness that become a strong, structural component of the resulting product.

An example of a type of substrate surfacing requiring compositions of the stated class is the refinishing of hulls of wooden boats that have been degraded so that the hulls require more than simply repainting. One known method of doing such refinishing is to apply glass fiber cloth or chopped glass strand mat to the hull surface and then impregnate and coat the cloth or mat with polyester resin. Such "fiberglassing" methods require much skill and attention to create a satisfactory finish and the resulting products may be defective in structural strength or in adherence of the surface layer to the substrate.

OBJECTS

A principal object of the present invention is the provision of new compositions for surfacing wood or other substrates.

Further objects include the provision of:

1. New methods of surfacing substrates.
2. New forms of surface protected products.
3. New compositions capable of producing tough, impact resistant, watertight surface layers on wood or other substrates.
4. New methods for refinishing the hulls of wooden boats.
5. Refinished wooden boats having hulls that are stronger and more impact resistant than the hull prior to refinishing.

Other objects and further scope of applicability of the present invention will become apparent from the detailed description given hereinafter; it should be understood, however, that the detailed description, while indicating preferred embodiments of the invention, is given by way of illustration only, since various changes and modifications within the spirit and scope of the invention will become apparent to those skilled in the art from this detailed description.

SUMMARY OF THE INVENTION

The foregoing objects are, in part, accomplished in accordance with the invention by the provision of new surfacing compositions consisting essentially of the following solid ingredients in the parts by weight indicated:

|  | parts |
| --- | --- |
| diatomite | 3 to 6 |
| expanded perlite | 1 to 3 |
| chopped glass fibers | 1 | in substantially homogeneous admixture with a liquid thermosettable resin, the weight ratio of said solid ingredients to said liquid resin being such as to provide a flowable composition, preferrably a ratio between 1 to 1 and 10 to 1.

In the preferred compositions, the thermosettable resin is polyester resin, epoxy resin, phenol-aldehyde resin, or amino-aldehyde resin. Mixtures of resins may be used.

The objects are further accomplished by a method of making such compositions that comprises homogeneously mixing together the stated solid ingredients and thereafter, adding the liquid resin to the dry mix and blending the resin and solid ingredients into a flowable uniform composition. Catalyst for curing of the thermosettable resin may be added to the resin before its addition to the dry mix or it may be added during the blending of resin and dry mix.

The objects are further accomplished by applying the flowable composition to a substrate in an amount that will form on the substrate a surface layer having a thickness between about 1 to 3 cms. In the preferred surfacing methods, the substrate is wood and expanded metal mesh is stapled or otherwise fastened to the exposed surface of the substrate and the surfacing composition is applied so as to completely fill the voids in said metal mesh and cover it over. The applied composition is smoothed by trowelling or in other suitable manner and then the resin is allowed to cure to produce a tough, impact-resistant, watertight surface layer.

The objects are further accomplished by the provision of the new surfaced products created by the methods as described.

DESCRIPTION OF PREFERRED EMBODIMENTS

The new surfacing compositions of the invention contain three essential ingredients, namely, diatomite, expanded perlite and chopped glass fibers.

Diatomite is a standard article of commerce having typically a density of about 0.2–0.3 gms./cc. It is also called diatomaceous earth, kieselguhr or tripolite. For use in the invention, it is preferred that the diatomite be of size to pass a 100 mesh standard sieve. Advantageous results are obtained using diatomite of particle size between about 1 to 100 microns. An example of a commercially available diatomite is that known in the trade as "Dicalite 14W" marketed by The Dicalite Company.

The diatomite serves, in part, to give body to the new surfacing composition in their final, hardened state.

Expanded perlite is also a standard article of commerce having typically a density that may vary from about 0.002 to 0.3 grams/cc., depending upon the method used in its expansion, e.g., see U.S. Pat. No. 2,501,698, the disclosure of which is incorporated herein by reference. Perlite is also called pearlite. For use in the invention, it is preferred that the expanded perlite have a particle size between about 0.1 and 5 mm.

The expanded perlite serves, in part, to give impact resistance to the new surfacing compositions in the final, hardened state.

Chopped glass fibers are a further standard article of commerce available in a variety of strand lengths and diameters. The strands may consist of a single filament or a bundle of filaments. For use in the invention, it is preferred that the chopped strands have a fiber length of between about 1 to 25 mm. and a diameter between about 10 to 1000 microns. An example of a commercially available chopped glass fiber product is that known in the trade as "919-4A" marketed by Certain-Teed Corporation.

The chopped glass fibers serve, in part, to give tensile strength to the new surfacing compositions in their final, hardened state.

A variety of thermosettable resins that can be used in the new compositions of the invention are commercially available. Preferred types are the polyester resins, epoxy resins, phenol-aldehyde resins and amino-aldehyde resins. Single resins or mixtures of the resins may be used. It is advantageous to use resins that are thixotropic to mitigate drooping or other movement of the surfacing composition when it has been applied and positioned on the substrate.

By way of illustration, preferred polyester resins will have a vicosity of about 1000–2000 cps. (Brookfield LVT at 77° F. and 60 rpm.), a 1% MEKP-50 set time at 77° F. of about 20 to 30 and a peak exotherm of about 250° to 350° F.

Useful polyester resins for the new compositions are those from unsaturated dicarboxylic acids, e.g., isophthalic acid, and aliphatic diols, e.g., ethylene glycol, propylene glycol, etc. They also include an unsaturated monomer, e.g., styrene, vinyl toluene, etc., present in about 5–50% by weight.

An example of a commercially available polyester resin is that known in the trade as "GLS Southern 1097-121" marketed by Commercial Resins Division of Interplastic Corporation.

In order to cure the thermosetting resin component of the new compositions catalysts, with or without, promoters or accelerators are used, preferably in an amount between about 0.5 to 2% by weight based upon the weight of the resin. For polyester resins typical catalysts are methyl ethyl ketone peroxide, benzoyl peroxide, etc. Promoters are copper naphthenate or copper octoate to which may be added tertiary amines, e.g., dimethyl amiline, to enhance catalytic activity.

A host of epoxy resins usable in the invention are commercially available. Such resins typically contain oxirane or 1, 2-epoxy groups. They are generally formed by reaction of a polyhydric alcohol or phenol with a halohydrin such as epihalohydrin. Specific examples of such resins are disclosed, for example, in U.S. Pat. Nos. 2,801,229; 2,735,829; 2,553,718; 2,716,099; 3,030,329; 2,658,884; and 2,658,885. Amine compounds are used as hardeners for curing the epoxy resins to thermoset condition, e.g., diethylene triamine, triethylene tetramine, dimethyl aminoethyl phenol, adducts of aliphatic amines and alkylene oxides, etc. (see U.S. Pat. Nos. 2,444,333; 2,585,115; 2,589,245 and 2,753,323).

A variety of phenol-aldehyde resins for use in the invention are commercially available. Such resins include phenol-formaldehyde resins, resorcinol-formaldehyde resins, cashew nut shell oil-modified phenol-formaldehye resins, etc. Hardening agents for such resins include polyamines, e.g., hexamethylenetetramine.

A variety of amino-aldehyde resins for use in the invention are also commercially available. Such resins include urea-formaldehyde resins, melamine-formaldehyde resins, propylene urea-formaldehyde resins, methyol formamide resins, dimethylol ethylene urea resins, polymethylol acetylene urea resins and urea-melamine-formaldehyde resins. Hardening agents for such resins include sodium bisulfite, zinc chloride, zinc fluoroborate, magnesium chloride, monoethanol amine hydrochloride, etc.

Any suitable mixing equipment may be used to form the new flowable surfacing compositions of the invention. This includes bambury mixers, barrel tumble mixers, cement mixers, etc. Once the composition has been prepared, it may be applied to the substrate in a variety of ways. One method is to spray it on the substrate using available spraying equipment. Plaster coating and pouring may also be used. A preferred method, particularly where the substrate is wood, e.g., the hull of a wooden boat, is to staple or otherwise fasten a layer of expanded metal mesh to the substrate and then trowel the composition into the mesh and then cover it to produce a smooth surface that completely hides the metal mesh. Metal mesh of diamond-shape pattern with 2.3×3.0 mm. is especially useful.

The thickness of the coating of the new compositions applied to the substrate can be varied and will be governed, in part, by the nature of the substrate and the type of conditions the surfaced product will encounter during use. Preferred thickness for the new surface layers is between about 5 to 30 mm. Such thicknesses can be attained in a single coating step, or alternatively, two or more separate applications of the new flowable compositions may be used to create the desired surface layer.

The surface layers produced in accordance with the invention may be put into service without further attention after the resin component has been fully cured. If two or more applications are applied, there are no cold joints; the material flows together as one unit. However, if more aesthetic appearance is required, the layers may be further smoothed by sanding, grinding, etc. Also, they may be painted or decorated in other ways to create whatever appearance is required for the final product or pigments may be added to the composition for color.

The embodiments of the invention in which an exclusive property or privilege is claimed are defined as follows:

1. A composition for use in producing tough, impact-resistant, watertight surface layers on wood or other substrates consisting essentially of the following solid ingredients in the parts by weight indicated:

|  | parts |
| --- | --- |
| diatomite | 3 to 6 |
| expanded perlite | 1 to 3 |
| chopped glass fibers | 1 | in substantially homogeneous admixture with a liquid thermosettable resin, the ratio of said solid ingredients to said liquid resin being such as to provide a flowable composition.

2. The composition of claim 1 wherein said resin is selected from the group consisting of polyester resins, epoxy resins, phenol-aldehyde resins and amino-aldehyde resins.

3. The compositions of claim 1 wherein said glass fibers have a length between about 2 to 25 mm. and a diameter between about 10 to 1000 microns.

4. The composition of claim 1 wherein said liquid resin is a polyester resin and the weight ratio of said resin to said solid ingredients is between about 1 to 1 and 1 to 10.

5. The composition of claim 1 prepared by dry mixing together said solid ingredients to form a uniform mixture thereof in the parts by weight specified, adding thereto catalyzed liquid thermosettable resin selected from the group consisting of polyester resins, epoxy resins, phenol-aldehyde resins and amino-aldehyde resins in a ratio of resin to said uniform mixture between about 1 to 1 and 1 to 10 and mixing said components until a substantially homogeneous, trowelable composition is producted.

6. The method of producing a tough, impact-resistant, watertight layer on the surface of a wood substrate which comprises stapling a layer of expanded metal mesh on that exposed surface of said substrate, applying composition as defined in claim 1 to said exposed surface in sufficient quantity to completely cover said surface to a depth greater than the thickness of said metal mesh, trowelling the applied composition to form a smooth surface thereof and allowing the resin component of said composition to cure.

7. The method of claim 6 wherein said substrate is the wooden hull of a boat.

8. A refinished wooden hull boat produced by the method of claim 7.

* * * * *